DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 8, 1972

901 O.G. 415

T901,018

POLYMERIC PHOTOSENSITIZERS

Franco Agolini, Wilmington, Del., assignor to E. I. du Pont de Nemours and Company, Wilmington, Del.

Continuation of abandoned application Ser. No. 846,257, July 30, 1969. This application June 1, 1971, Ser. No. 149,082

Int. Cl. C08f *29/12*

U.S. Cl. 260—897

No Drawing. 14 Pages Specification

A crosslinked polymeric composition having an improved amount of polymer crosslinking throughout the composition consisting essentially of a blend of (A) an alpha olefin selected from polyethylene or polypropylene, and (B) a copolymer of an alpha olefin selected from ethylene or propylene and from 0.01 to 10 mole percent of vinyl acetophenone having the structural formula:

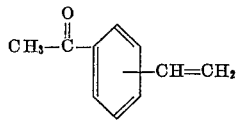

The process of crosslinking the above blend is carried out by exposing the blend to radiation having a wavelength of about 2,000 to 7,000 A. for a period of about 0.1 second to about 30 minutes. Short periods of exposure time are used with higher energy radiation, e.g., xenon radiation and longer periods of time are required when lower energy radiation sources are used, e.g., sun lamp.

Polymers having this improved degree of crosslinking show a corresponding improvement in properties such as dimensional stability, resistance to permanent stress deformation, resistance to stress cracking, as well as improved resistance to grease, oil and organic solvents. These improved properties make these polymers particularly useful to prepare shaped articles such as packaging material, films and tubing.